United States Patent [19]
Takahashi et al.

[11] 3,946,097
[45] Mar. 23, 1976

[54] PROCESS FOR FORMING CONTINUOUS FIBER REINFORCED MATERIAL EMBEDDED IN THERMOSETTING RESIN

[75] Inventors: Mitsuhiro Takahashi, Fuchu; Tadao Senoo, Gifu, both of Japan

[73] Assignee: Ube-Nitto Kasei Co., Ltd., Tokyo, Japan

[22] Filed: Jan. 3, 1974

[21] Appl. No.: 430,515

[30] Foreign Application Priority Data
Jan. 27, 1973 Japan .................... 48-11266

[52] U.S. Cl. .......... 264/90; 264/102; 264/135; 264/145; 264/174
[51] Int. Cl.[2] .................... B29D 23/05
[58] Field of Search ........... 264/135, 136, 174, 145, 264/88, 102, 90

[56] References Cited
UNITED STATES PATENTS

| | | | |
|---|---|---|---|
| 2,956,311 | 10/1960 | Raydt | 264/174 X |
| 2,979,431 | 4/1961 | Perrault | 264/135 X |
| 3,404,432 | 10/1968 | White | 264/174 X |
| 3,470,051 | 9/1969 | Meyer | 264/174 X |
| 3,579,623 | 5/1971 | Thomson | 264/135 |
| 3,801,406 | 4/1974 | Debendetti | 264/145 X |

FOREIGN PATENTS OR APPLICATIONS
1,015,144    1965    United Kingdom

*Primary Examiner*—Richard R. Kucia
*Attorney, Agent, or Firm*—Wenderoth, Lind & Ponack

[57] ABSTRACT

A continuously supplied reinforcing material is impregnated with an uncured thermosetting resin and shaped into a predetermined sectional configuration, which is then covered with a forcibly extruded molten thermoplastic resin. The thermoplastic resin is immediately cooled to enclose the shaped fiber material with the solidified thermoplastic resin, and a thus continuously formed material is obtained.

10 Claims, 12 Drawing Figures

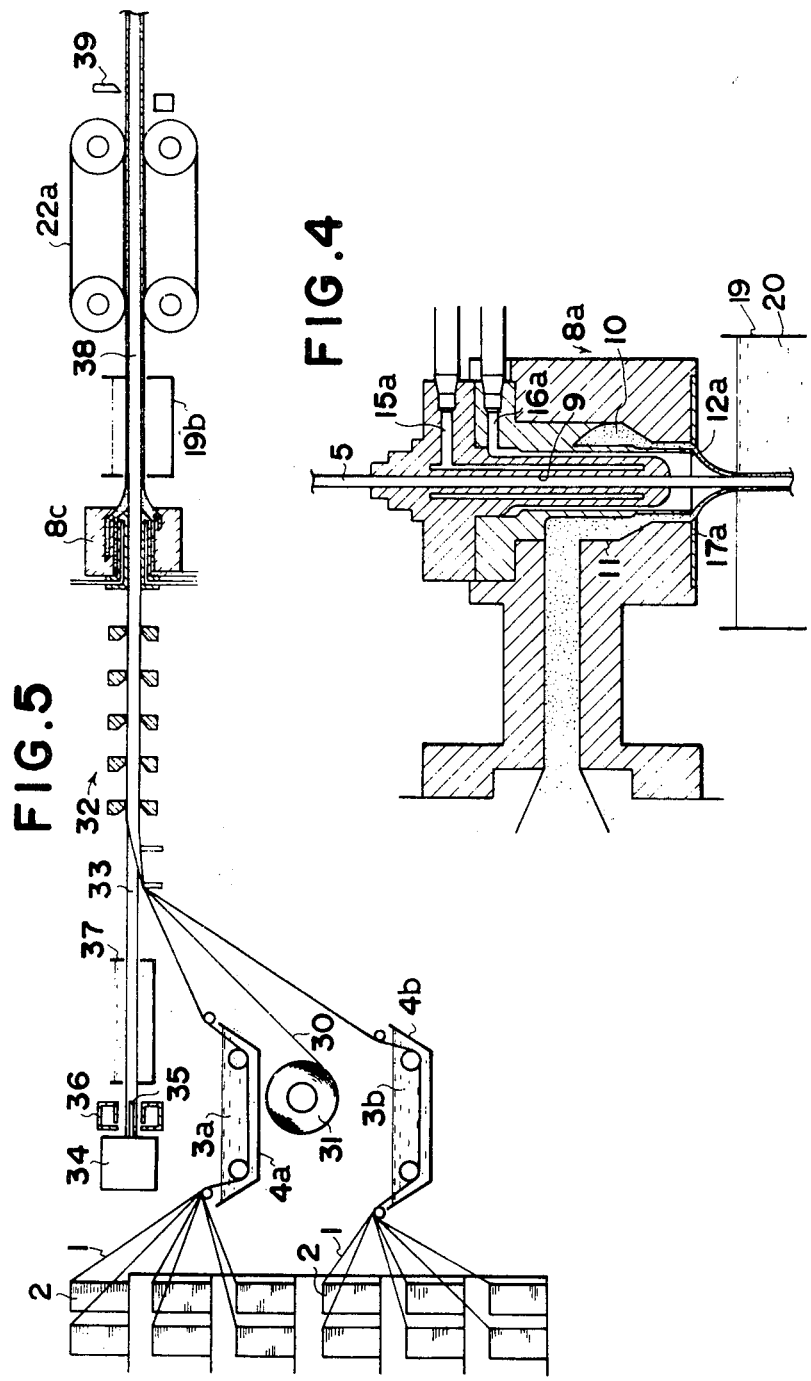

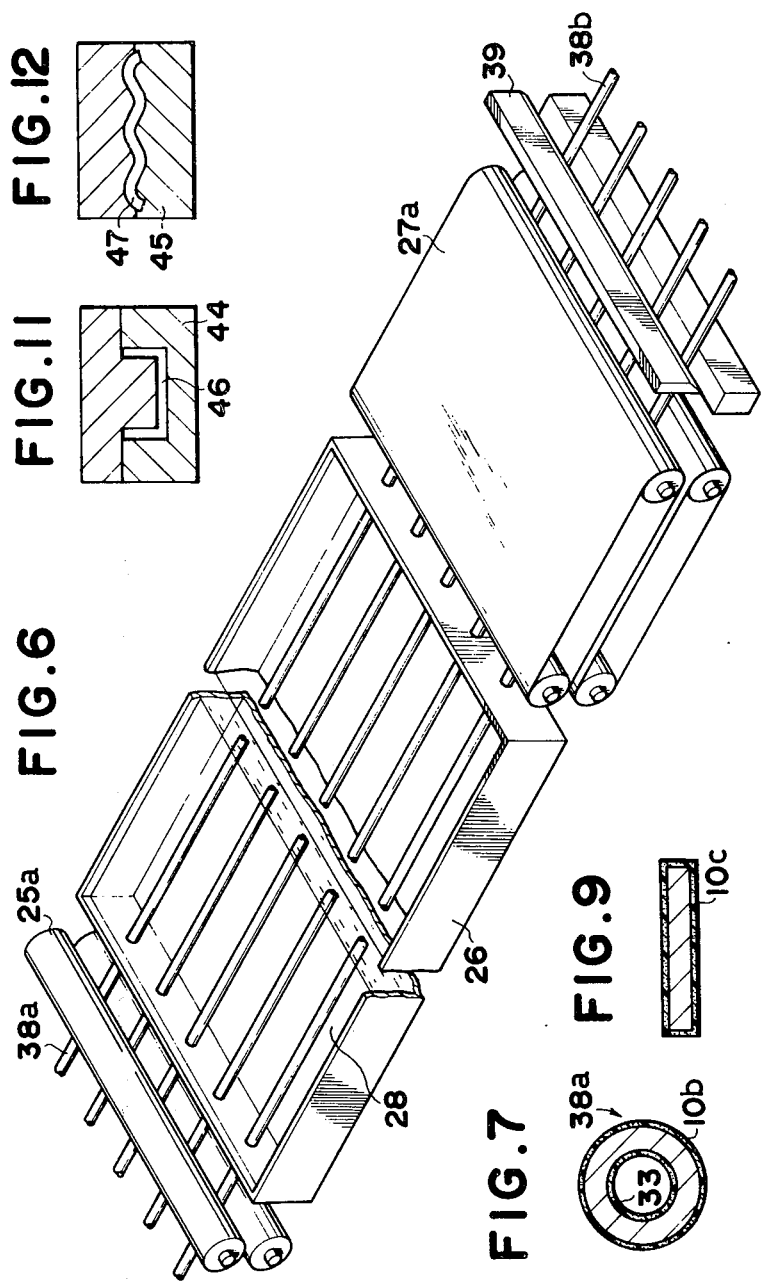

PROCESS FOR FORMING CONTINUOUS FIBER REINFORCED MATERIAL EMBEDDED IN THERMOSETTING RESIN

This invention relates to a process for forming a continuous fiber reinforced material embedded in a thermosetting resin.

Among the known continuous fiber reinforced materials embedded in thermosetting resin, glass reinforced plastic is most popular, in which material the glass fiber is used as reinforcing material. This glass reinforced plastic is formed by impregnating glass fibers with an uncured thermosetting resin and then subjecting same to a heat treatment for a predetermined period of time to cure the resin into an integral combination with the glass fibers.

In this art, roughly three types of methods are known for forming continuous glass reinforced plastic: i.e. a continuous laminating method used for forming corrugated sheets, flat sheets or the like; a continuous drawing method used for forming rods, channelled materials, angled materials or the like; and a continuous filament winding method used for forming pipes or the like.

According to the continuous laminating method, a resin-impregnated glass fiber mass is sandwiched between flat films of Mylar, vinylon, cellophane or the like and then the assembly subjected to conditions for curing of the resin while continuously forming the assembly to the desired shape. After the resin has been cured, the films are stripped off. This method, however, has the drawbacks that both side portions of the formed sheet are sometimes solidified irregularly to present a non-uniform shape and that stripping-off of the films is troublesome.

In the continuous drawing method, a thermosetting resin is cured while a glass fiber bundle impregnated therewith is drawn or pulled out through a die cavity having a predetermined sectional shape. According to this method, while the glass fiber bundle is drawn out through the die cavity, the bundle is in contact with the inner surface of the die cavity, so that a part of the resin adheres to the cavity wall and is cured there to obstruct the die opening, with the result that the surface of the molded material is roughened and the drawing load is increased so as to make it difficult or even impossible to proceed with the continous drawing operation.

In order to solve these problems in the drawing process, there have been proposed a method in which final curing is accomplished after the fiber bundle has passed the die and a method using a film for coating the fiber bundle. According to the former method, the resin-impregnated fiber bundle is not cured completely but merely subjected to preliminary curing in the die, and after passing the die, the fiber bundle is guided into a heating oven where the curing is completed. This method, however, has a drawback that, if the glass content is high, the fiber bundle which has passed the die can not be retained in the desired shape due to resilience of the individual fibers, making it impossible to obtain products with good surface configuration.

In the latter method using the coating film, in order to prevent the resin from being directly contacted with the wall surface of the die cavity while the resin is cured, the resin-impregnated glass fiber bundle is coated with a film and then guided into the die. After curing the resin, the film is stripped off. However, in this method, the work of application and stripping off of the film are troublesome, and also, since it is impossible to perfectly cover the entire periphery of the resin-impregnated glass fiber bundle with the film, resin may flow out from the film end and adhere to the die cavity wall. Further, streaks may be left on the formed product by the film edge after removal of the film. In addition, this method is inapplicable for forming elongated material having a concave shape such as channelled and angled members.

According to the continuous filament winding method, the resin-impregnated glass fiber rovings or glass tapes are wound upon a mandrel which is successively fed, and after curing the resin by heating, the mandrel is pulled out to leave a pipe. There have also been proposed a method in which, instead of using the mandrel, various types of pipes sold in market are used and integrated with glass fiber to form composite pipes, and a method in which the glass fiber rovings are fed in the longitudinal direction of the pipe when so required. In each case, in order to give the glass fiber the desired pipe shape on the mandrel, a binding tape is helically coiled or a film cover is applied, and after curing the resin, the tape or film is removed. Thus, these methods involve a complicated and troublesome step of applying the tape or covering the film.

As described above, although the various methods have been proposed to form continuous glass fiber reinforced materials embedded in thermosetting resin in accordance with the shapes of the end products, in addition to the drawbacks mentioned, all of these methods have the following serious drawbacks.

Firstly, in all of the known methods, the formed products are drawn out in a linear form with the thermosetting resin being cured to a predetermined sectional shape. Therefore, in spite of the fact that the fiber reinforced plastic has a wide variety of possible uses in various fields and is in high demand owing to its light weight and toughness, its use is limited to linear articles such as pipes, fishing rods, golf club shafts, ski stocks and the like. Also, it is hardly possible, mainly because of cost, to bend the product into a desired configuration for specific uses, such as; for indoor piping for gas or water supply.

Secondly, in the known methods, the formed products are drawn out with the thermosetting resin being cured to a respectively predetermined sectional shape, so that, in the production plants, the glass fiber reinforced plastic sheets or bars with certain sectional shapes such as for example strip-shaped, angle-shaped, channel-shaped or such are respectively formed and stocked and shipped as demanded. However, if, for instance, the channel-shaped materials, only are much in demand, with the demand for the other types such as strip-shaped and angle-shaped materials being slight, the turnover of the latter types, which have been produced in surplus, is made worse, causing an increase in manufacturing cost. Also, it is impossible, due to poor productivity (mentioned below), to rapidly increase production of the much demanded channelled materials, and there may arise a situation where even full-capacity production can not meet the demand.

Thirdly, the thermosetting resins such as unsaturated polyester or epoxy resin, unlike the thermoplastic resins, usually require more than 5 minutes for completing the curing reaction even when a curing catalyst is added. Accordingly, a very lengthy chamber is required for curing the thermosetting resin in the reinforcing fiber advancing continuously. For example, even when of drawing out a continuous resin-impregnated fiber mass or bundle at a moderate rate of 1.8 m/min, there is required a curing chamber with a length of more than 9 meters. Thus, according to the known methods, when one piece or one sheet of continuous glass fiber mass impregnated with thermosetting resin, which has been delivered from a shaping unit, passes through a 9-meters-long curing chamber, a length of only 1.8 meters of such mass or bundle can be treated in one minute. In order to increase the drawing-out speed of the fiber mass or bundle, one solution would appear to be to elongate the curing chamber. However, where the fiber mass or bundle passes through a die and is cured therein, the elongated curing chamber or die makes it impossible to draw out the fiber mass or bundle therethrough due to increased friction therebetween.

Fourthly, in the product formed by the known method, the glass fibers may break through and emerge on the surface of the product, thus impairing the external appearance of the product.

It is therefore an object of the present invention to provide a process of forming a continuous fiber-reinforced plastic material that can be formed into a desired shape by the user.

It is another object of the present invention to provide a process of forming continuous fiber reinforced plastic materials having desired sectional shapes, wherein the process is suited for effective factory production according to the demand.

It is still another object of the present invention to provide a process of forming continuous fiber reinforced thermosetting resin materials with extremely high productivity and reduced production cost.

Yet another object of the present invention is to provide a process of forming continuous fiber reinforced plastic materials with good external appearance without the possibility of causing the fiber to emerge on the surface of the formed product.

According to the present invention, there is provided a process comprising the steps of impregnating a continuously supplied reinforcing fiber material with an uncured thermosetting resin, shaping the resin-impregnated fiber material into a predetermined sectional configuration, forcibly extruding a molten thermoplastic resin under pressure into contact with and covering the shaped fiber material, immediately cooling the thermoplastic resin to enclose the shaped fiber material with the solidified thermoplastic resin, and taking out the thus formed continuous material.

Preferably, the molten thermoplastic resin is extruded in a thin layer so as to converge radially in the direction of advancement of the fiber material and a negative pressure is applied between the inside of the extruded thermoplastic resin and the shaped fiber material, whereby any vaporized substances therebetween and air bubbles in the uncured thermosetting resin can be effectively dispelled to make it possible to obtain a product free of air bubbles. Also, the molten thin thermoplastic resin is not pulled excessively in the direction of advancement of the fiber material, so that it is possible to prevent damage to the thin thermoplastic resin. Furthermore, the application of the negative pressure enables the thin thermoplastic resin to maintain the set sectional shape of the extruded portion and ensures fast adhesion of the thermoplastic resin to the surface of the fiber material.

To form a solid rod-shaped continuous material, plural reinforcing fiber rovings are impregnated with the uncured thermosetting resin and shaped into a desired circular sectional shape, which is then covered with the thermoplastic resin in the above-described manner. When it is desired to form a hollow pipe-shaped continuous material, the reinforcing fiber material such as cloth, mat or the like, and/or reinforcing fiber rovings are impregnated with the uncured thermosetting resin and enclosed around a previously formed flexible pipe singly or in lamination and thin shaped to a desired diameter, and then this assembly is successively covered with the thermoplastic resin in the above-said manner.

The thus formed rod — or pipe — shaped continuous material is free to bend since the inside thermosetting resin is uncured. Therefore, in use, the user can bend such material to any desired configuration and then heats it for a certain period of time to cure the thermosetting resin to thereby obtain a tough and strong pipe or rod.

To form linear rods or pipes in great quantity in a factory with the thermosetting resin being linearly cured, plural pieces of the rod — or pipe — shaped continuous materials filled with uncured thermosetting resin are arranged in parallel and guided linearly into a curing tank. The present process has a remarkable advantage when linear rods and pipes are thus produced. That is, since the molten thermoplastic resin covering the shaped fiber material can be solidified by cooling it in water for a period of several seconds (3 to 4 seconds), if for instance a 2 meters-long cooling water tank is used, it is possible with the present invention to obtain the uncured thermosetting resin filled continuous material at the rate of 1 m/sec. Accordingly, if it is intended to cure the thermosetting resin in the continuous material by passing it through a curing tank of 9 – 10 meters length at the speed same as that for conventional curing, 30 – 32 pieces of rod — or pipe — shaped continuous materials, each having been cut to a predetermined length, can be treated for curing at the same time, thus accomplishing 30 – 32 times as high production efficiency as in the conventional process.

In case of forming the rods or pipes with linearly cured thermosetting resin, the core pipe around which the reinforcing fiber cloth, mat or rovings enclose may be a hard type.

To form a corrugated sheet, channelled or angled material, the reinforcing fiber materials such as cloth or mat or the reinforcing fiber rovings, either singly or in lamination, are impregnated with the uncured thermosetting resin and are shaped into a sheet or a strip of a desired width. Such sheet or strip is coated with the thermoplastic resin in the above-said manner. The thus formed continuous materials are kept in stock, and when so required, such sheet — or strip — shaped continuous material is passed through a deforming die having a corrugated, channel-shaped or angle-shaped section and placed at the inlet side of the curing tank so as to partially cure the thermosetting resin in the deforming die. In this case, too, the user can bend the sheet — or strip — shaped continuous material (filled with uncured thermosetting resin) into any configuration he desires, and can obtain a tough material with a desired shape. Also, a plurality of deforming dies may be installed in the curing tank for treating plural continuous materials simultaneously to elevate the productivity.

Further, according to the process of the present invention, since the formed product with its thermosetting resin being cured is covered with the solidified thermoplastic film, there is no possibility that, even if the product is bent, the component reinforcing fibers will break through and emerge on the surface as often seen in the conventional products, and hence the present product will always have a very good external appearance.

Although glass fiber is most typical of the reinforcing fiber material used in the present invention, it is also possible to use other types of fiber such as vinylon, nylon, polyester, polypropylene, etc. As for the thermosetting resin, although unsaturated polyester is most typical, epoxy resin, phenol resin or such is also usable. As the thermoplastic resin, polyethylene, polypropylene, polyvinyl chloride, nylon or such may be used selectively according to the purpose of use. Viscosity of the thermoplastic resin used should preferably be more than 1,000 poise.

The aforementioned and other objects and features of the present invention will become more apparent from the following detailed description of specific embodiments of the invention when read in conjunction with the accompanying drawings, in which:

FIG. 4 is a sectional view showing a preferred device for extruding the thermoplastic resin to cover the reinforcing fibers impregnated with the uncured thermosetting resin;

FIG. 5 is a diagrammatic side view showing a process for forming a pipe-shaped continuous material according to the present invention;

FIG. 6 is a diagrammatic perspective view showing a process of linearly curing the thermosetting resin in plural pieces of pipe-shaped continuous material formed by the process of FIG. 5;

FIG. 7 is a sectional view of a pipe-shaped continuous material formed by the process of FIG. 5;

FIG. 9 is a sectional view of a sheet-shaped continuous material formed by the process of FIG. 8;

FIG. 11 is a sectional view of a channel-shaped deforming die used in the process of FIG. 10; and FIG. 12 is a sectional view of a corrugated deforming die used in the process of FIG. 10.

Figure 1:
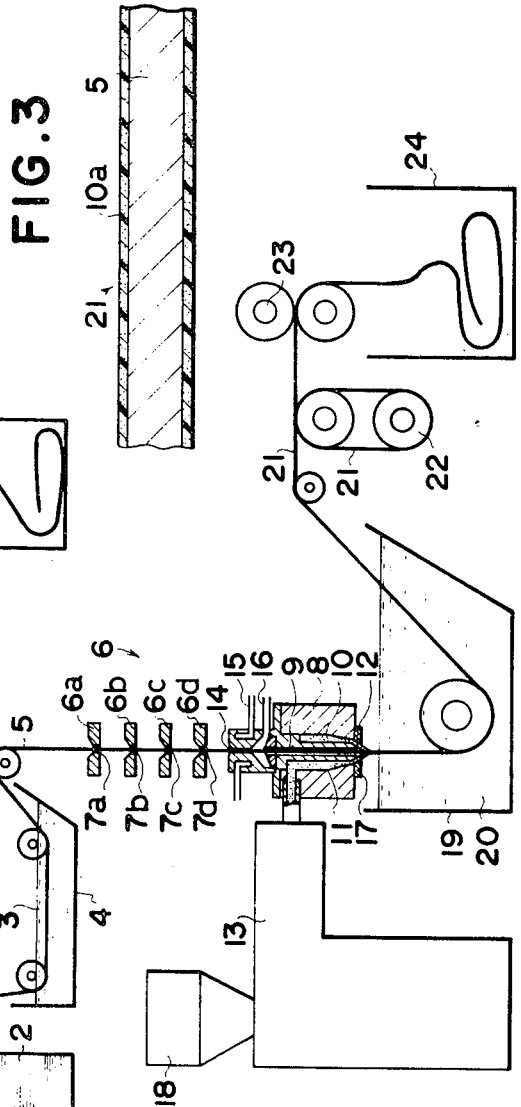
FIG. 1 is a diagrammatic side view showing a process for forming a rod-shaped continuous material composed interiorly of reinforcing fibers impregnated with an uncured thermosetting resin and covered exteriorly with a solidified thermoplastic resin, according to the present invention.

First, a process according to the present invention will be described with reference to FIGS. 1 to 3 for forming a solid rod-shaped continuous material. Plural pieces of glass fiber rovings (1) in a number depending on the diameter of the rod to be formed are drawn out from their respective packages (2) and, after being combined into a bundle, are led into a vessel (4) filled with an uncured thermosetting resin (3). Used as the thermosetting resin (3) in this embodiment is unsaturated polyester containing 3% of benzoyl peroxide which is a curing catalyst. The fiber bundle (5) impregnated with the thermosetting resin (3) is then led into a series of shaping dies (6a – 6d). Each of the shaping dies (6a – 6d) has a hole (7a – 7d), circular in sectional shape, and is aligned to allow linear passage of the resin-impregnated fiber bunble (5). The holes (7a – 7d) of the shaping dies (6a – 6d) are arranged to gradually become smaller in diameter as their distances from the resin vessel (4) increases so that, while the fiber bundle (5) passes through the holes (7a – 7d) of the shaping dies (6a – 6d) successively, the fiber bundle (5) is shaped circularly into the predetermined sectional shape and the superfluous thermosetting resin is squeezed off. Thus, the bundle (5) which passes the final shaping die (6d) is given a circular sectional shape of the desired diameter. This bundle is then led into an extrusion die (8). The extrusion die (8) has a central passage (9) through which the fiber bundle (5) is allowed to pass linearly while maintaining the given shape. Around the central passage (9) in the extrusion die (8) is formed an annular passage (11) through which a molten thermoplastic resin (10) is extruded. The annular passage (11) is open at its one end to the outlet (12) of the extrusion die (8) and the other end is connected with an extruder (13) for the thermoplastic resin (10). Also provided in the extrusion die (8) are a cooling water circulation passage (15) which is disposed around the central passage (9) adjacent the inlet (14) of the die (8) for preventing the thermosetting resin from being deposited and partially cured in the central passage (9) of the extrusion die (8) heated by the molten thermoplastic resin (10), and a negative pressure passage (16) for better adhesion of the fiber bundle (5) with the molten thermoplastic resin (10). Secured around the outlet (12) of the extrusion die (8) is an annular nozzle plate (17) whereby the thermoplastic resin (10) is thinly extruded in an inverted conical form or to converge radially relative to the direction of advancement of the fiber bundle (5).

A preferred extrusion die is shown in FIG. 4. In this die, generally designated (8a), a cooling water circulation passage (15a) is formed along a major portion of the central passage (9) of the fiber bundle (5). An annular negative pressure passage (16a) is also formed between and along the cooling water circulation passage (15a) and the annular passage (11) of the thermoplastic resin (10). All of the central passage (9), negative pressure passage (16a), and annular passage (11) of the thermoplastic resin (10) are open at the outlet (12a) of the die (8). The opening of the annular passage (11) is so arranged that the molten thermoplastic resin (10) will be extruded in an inverted conical shape relative to the direction of advancement of the fiber bundle (5) by a tapered nozzle plate (17a).

In the instant embodiment, the thermoplastic resin (10) is high-density polyethylene which has viscosity of 200,000 poise (melt index of 0.3 g/10-min) and is melted at 230° to 240°C. It is supplied as needed into the extruder (13) from a hopper (18).

The thermoplastic resin (10) extruded from the extruder (13) passes through the annular passage (11), and when emerging from the outlet (12) of the die (8), the resin flow is directed inwardly by the nozzle plate (17) so that it is thinly extruded like a film and in an inverted conical shape to the outside of the die (8) so as to contact and cover the fiber bundle (5) which is continuously supplied through the central passage (9). In this case, if a negative pressure is applied through the negative pressure passage (16), the vaporized substances from the molten thermoplastic resin and air bubbles in the uncured thermosetting resin can be removed to make possible formation of a bubble-free product. Further, since the molten thermoplastic resin is not pulled in excess in the direction of advancement of the fiber bundle (5), it is possible to prevent damage to the film and to ensure fast adhesion to the fiber bundle while maintaining the desired circular sectional shape.

The glass fiber bundle (5) impregnated with the uncured thermosetting resin and coated with the molten thermoplastic resin in the above-described manner is immediately led into a cooling water tank (19) in which cooling water (20) is circulated while it is maintained at a predetermined temperature. As the molten thermoplastic resin film is immediately solidified in the cooling water (20) and cooled therein within a period of 3 to 4 seconds, the thermosetting resin (3) in the fiber bundle (5) does not have induced therein any polymerization reaction.

The continuous material (21) thus coated with the solidified thermoplastic resin (10a) is taken up on a pair of draw rollers (22) and then passed through shake-down rollers (23) from which the continuous material is shaken down into a receiving box (24).

In this embodiment, the fiber bundle (5) coated with the molten thermoplastic resin is immersed through a length of 2 meters in the cooling water (20), and the continuous material (21) is taken up at the rate of 1 m/sec. The thus formed continuous material (21), as shown in FIG. 3, has the inside filled with the glass fiber bundle (5) impregnated with the uncured thermosetting resin and is coated externally with the solidified thermoplastic resin (10a). Therefore, this material (21) is free to bend or curve. It is possible to form the material (21) with a glass fiber content of up to 75%.

An practical use the thus formed rod-shaped continuous material (21) is cut into a desired length, bent to a desired configuration and then subjected to a heat treatment which is a known method to cure the inside thermosetting resin (5), whereby a desired tough and lightweight plastic article can be obtained.

Figure 2:
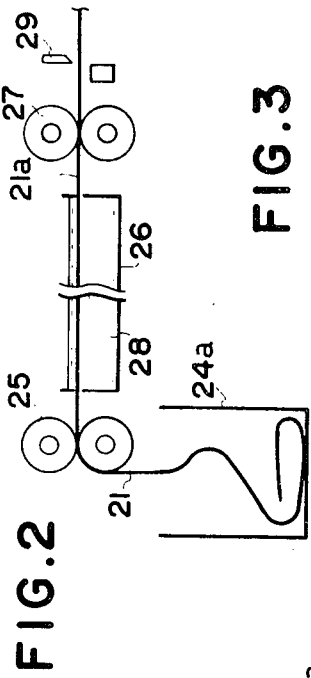
FIG. 2 is a diagrammatic side view showing a process of linearly curing the thermosetting resin in the rod-shaped continuous material formed by the process of FIG. 1.
Figure 3:
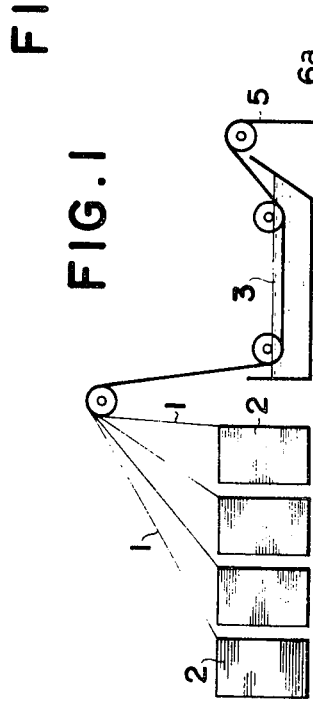
FIG. 3 is a sectional view of the rod-shaped continuous material formed by the process of FIG. 1.
Figure 8:
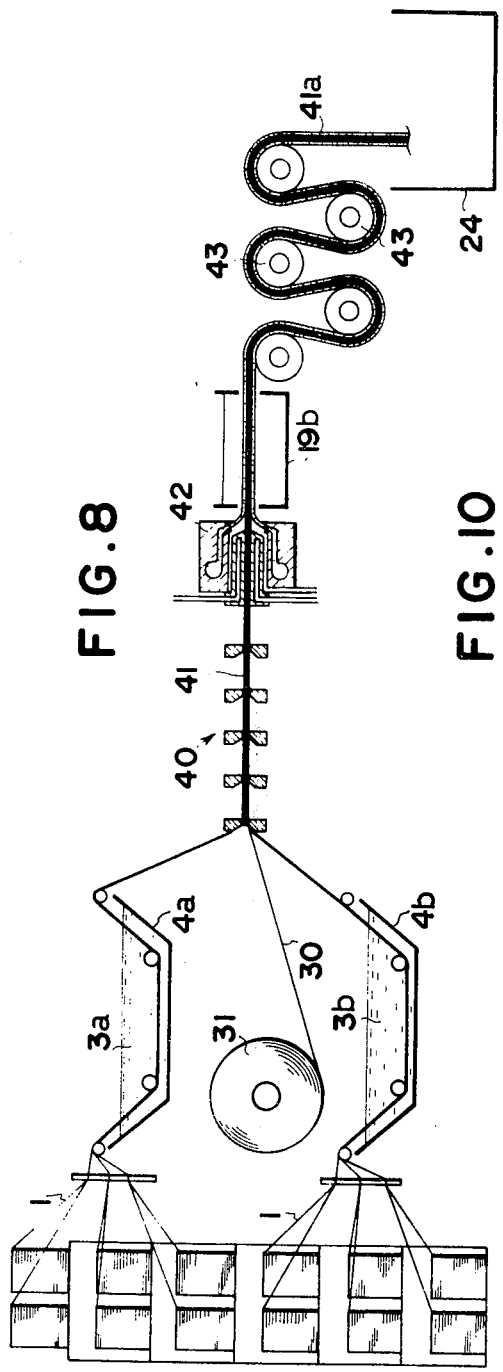
FIG. 8 is a diagrammatic side view showing a process for forming a sheet-shaped continuous material according to the present invention.
Figure 10:
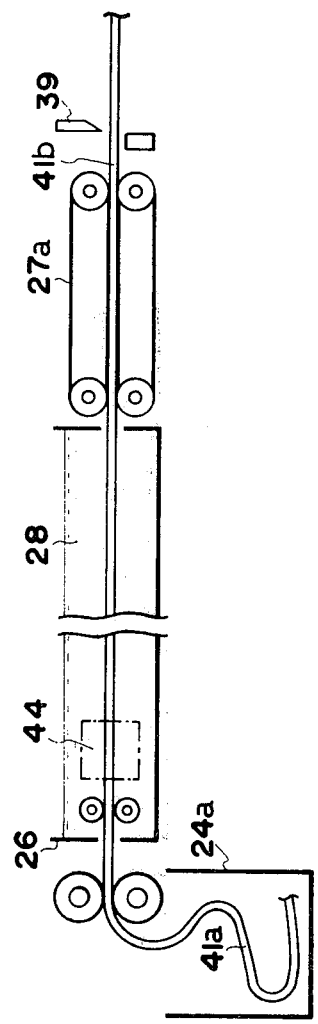
FIG. 10 is a diagrammatic side view showing a process of forming the sheet-shaped continuous material into a desired sectional shape and curing the thermosetting resin in the continuous material formed by the process of FIG. 8.

FIG. 2 shows a process for linearly curing the thermosetting resin in the rod-shaped continuous material (21) formed by the process of FIG. 1. This process is suited for factory production of the articles. The rod-shaped continuous material (21) which has been cut to a desired length and stored in a receiving box (24a) is delivered out therefrom through a pair of feed rollers (25) and then passed through a curing tank (26) while being drawn linearly by take-up rollers (27). The curing tank (26) measuring about 10 meters in length in this embodiment is filled with hot water (28) heated to about 97°C. The thermosetting resin requires about 5 minutes to complete its curing reaction, and hence the take-up rate is about 1.8 m/min (about 3 cm/sec). The linearly formed rod-shaped material (21a) is cut to desired lengths by a cutter (29).

Although in FIG. 2, for simplicity of explanation, there is shown a curing treatment for a single piece of the continuous material (21), it is more effective to treat plural pieces of continuous materials (21) simultaneously by passing them through the same curing tank (26). According to the embodiment of the present invention, the rod-shaped continuous material with its thermosetting resin uncured (21) can be formed at the rate of about 60 m/min while the rod-shaped material (21a) with its thermosetting resin being cured linearly can be drawn out at the rate of about 1.8 m/min, so that for forming 18 meter-long cured rod-shaped materials (21a), it is possible to treat 33 pieces of uncured rod-shaped materials (21a) simultaneously through the same curing tank (26).

Since the thus formed rod-shaped material the thermosetting resin of which is being cured has its surface coated with polyethylene resin, no glass fibers will project above the surface of the formed product unless the product is completely broken. Also, even after one-week immersion in warm water of about 50°C, little deteriorration of the physical properties was observed.

FIGS. 5 and 6 show another embodiment of the present invention for forming a pipe-shaped continuous material. A plural number of glass fiber rovings (1) and a glass chop strand mat (30) having a width substantially equal to the outer peripheral length of the pipe to be formed are used as the reinforcing fiber material. The glass fiber rovings (1) are divided into two groups, and the plural glass fiber rovings constituting each group are drawn out from the respective packages (2), then bundled together are passed through vessels (4a) and, (4b) containing uncured thermosetting resin (3a) and, (3b), so that each bundle of rovings is impregnated with the resin. Unsaturated polyester containing 3% of benzoyl peroxide as a curing catalyst is used as the thermosetting resin as in the preceding embodiment. The glass chop strand mat (30) is drawn out from its roll (31) and sandwiched between the two groups of glass fiber rovings impregnated with the resin, and the fiber mass is then led to a series of shaping dies (32). In the meanwhile, a pipe (33) made of a molten thermoplastic resin is also continuously led into the series of shaping dies (32) at the same speed as the fiber mass (1), (30). The pipe (33) may be formed by a known method, as for instance by extruding a molten thermoplastic resin (for example high-density polyethylene having viscosity of 200,000 poise (melt index of 0.3 g/10-min) and melted at 230° to 240°C) around a mandrel (35) from an extruder (34) and passing it through an air precooler means (36) and a cooling water tank (37).

Each of the shaping dies (32) has a central hole which gradually becomes smaller in diameter as its distance from the resin vessels (4a) and (4b) increases as in the embodiment of FIG. 1. When the fiber mass partly is wrapped around the thermoplastic pipe (33) and is passed through the series of shaping dies (32), any extra thermosetting resin (3) is squeezed off, and when passing the final shaping die, the fiber mass (1), (30) is turned into a perfect annular shape of the desired diameter and is completely wrapped around the thermoplastic pipe (33).

The pipe (33), which has thus been wrapped by the fiber mass (1), (30), is then led into an extrusion die (8c). This extrusion die (8c) has substantially the same construction as the die (8a) shown in FIG. 4. Accordingly, as in the case of FIG. 1, the fiber mass which has passed the extrusion die (8c) is covered with a molten thermoplastic resin (10) which is thinly extruded in a conical shape at a location near the outlet of the die (8c) and then the assembly is immediately guided through a cooling tank (19b). Used in this embodiment as the thermoplastic resin is low-density polyethylene having viscosity of 170,000 poise (melt index of 0.4 g/10-min) and melted at 220° to 240°C. The resultant pipe-shaped continuous material (38) with its thermoplastic resin having been solidified, while passing through the cooling tank (19b), is drawn by a device (22a) and then cut to a predetermined length by a cutter (39).

The pipe-shaped continuous material (38) formed in the above manner is composed of a core pipe (33) made of a thermoplastic resin, a layer of fiber mass (1), (30) impregnated with the uncured thermosetting resin (3a), (3b), and an external solidified thermoplastic resin layer (10b), which are arranged concentric to each other as shown in FIG. 7. When forming a pipe-shaped continuous material measuring for instance 20 millimeters (mm) in inner diameter and 30 mm in outer diameter, firstly, a core pipe (33) having an inner diameter of 20 mm and an outer diameter of 22 mm is made by a known method. Then, 144 pieces of glass fiber rovings are divided into two groups, and an 80 mm-wide glass chop strand mat is sandwiched between the two groups of rovings to form a fiber mass, the latter being then wrapped around the pipe (33). Then, the assembly is passed through a series of shaping dies (32) arranged such that the first die hole is 50 mm in diameter and the final die hole is 29 mm in diameter, and is finally coated with a 0.5 mm-thick layer of thermoplastic resin (10b).

Although in the above embodiment there has been described the pipe-shaped continuous material the inside or core pipe (33) of which is made of a such material and with such thickness as to allow maintenance of the linear state by itself, it is also possible to form a flexible pipe-shaped continuous material containing an annular layer of uncured thermosetting resin by making the core pipe (33) from a flexible material or with a reduced thickness and extending the mandrel (35) to the inlet of the cooling tank (19b). If the thus formed flexible pipe-shaped continuous material is bent to a desired configuration and heat-treated, there can be obtained a tough and light-weight pipe section of a desired shape.

For linearly curing the pipe-shaped materials (38a) each having therein the fiber mass impregnated with uncured thermosetting resin, plural pieces of pipe-shaped materials (38a) are guided by feed rollers (25a) into a 10 meter-long curing tank (26) filled with hot water (28) heated to 90° to 95°C as shown in FIG. 6. The thermosetting resin in each of the pipe-shaped materials (38a) is completely cured while they are passed through the curing tank (26), and the thus treated materials (38b) are drawn out of tank 26 by a device (27a) and cut to a desired length by a cutter (29).

In this embodiment, as in the first embodiment aforedescribed, the pipe-shaped continuous materials (38a) filled with the uncured thermosetting resin can be produced at the rate of about 1 m/min and the pipe-shaped materials (38b) with the thermosetting resin being cured linearly can be taken up at the rate of about 1.8 m/min, so that when forming 18 meter-long cured pipe-shaped materials (38b), 33 pieces of uncured pipe-shaped material (38a) can be treated simultaneously with the same curing tank (26).

The glass fiber content in the thermosetting resin layer of each cured pipe-shaped material (38b) with an inner diameter of 20 mm and an outer diameter of 30 mm was 65 weight % and the bending modulus was 2300 kg/mm².

Now, still another embodiment of the present invention for forming flat sheet-shaped, channel-shaped or corrugated sheet-shaped materials will be described with reference to FIGS. 8 to 12. As in the embodiment of FIG. 5, plural glass fiber rovings (1) and a glass chop strand mat (30) having a width substantially equal to that of the sheet-shaped material to be formed are used as reinforcing fiber material. The glass fiber rovings (1) are divided into two groups, with each group of rovings being bundled together and passed through a respective vessel (4a) and (4b) filled with an uncured thermosetting resin (3a) and (3b) prepared in the same way as in the embodiment of FIG. 5, and then the mat (30) is sandwiched between the two groups of the rovings, the fiber mass being then passed through a series of shaping dies (40).

Each of the shaping dies (40) has a hole rectangular in sectional shape, the holes gradually becoming smaller as their distances from the resin tanks (4a) and (4b) increase. While the resin-impregnated fiber mass (41) passes through the series of shaping dies (40), superfluous resin is squeezed off, and when passing through the final shaping die, the fiber mass is given a desired sectional shape. This fiber mass (41) is then led into an extrusion die (42) having a central passage of the same shape as the rectangular hole in the final shaping die. A molten thermoplastic resin (10) prepared in the same way as in the embodiment of FIG. 5 is thinly extruded from the extrusion die (42) in a tetrahedral conical form to cover the outer periphery of the fiber mass (41) which has emerged from the die (42). The molten thermoplastic resin covering the fiber mass is immediately cooled in the cooling tank (19b) and the thus formed sheet-shaped continuous material (41a) composed of the fiber mass (41) impregnated with uncured thermosetting resin and coated with the solidified thermoplastic resin (10c) is drawn out of tank (19b) by plural rollers (43) and then shaken down into a receiving box (24).

The sectional shape of this sheet-shaped continuous material (41a) is shown in FIG. 9. For forming such a sheet-shaped continuous material (41a) having a sectional dimension of for example 5.5 mm × 152 mm according to the process shown in FIG. 8, 200 pieces of glass fiber rovings are divided into two groups (each group comprising 100 pieces of rovings) and a 148 mm-wide glass chop strand mat is sandwiched between the two groups of rovings. The fiber mass is passed through a series of shaping dies arranged such that the sectional dimensions of the holes in the first and final shaping dies are 10 mm × 150 mm and 3.5 mm × 150 mm, respectively, and then is covered with a 1 mm-thick thermoplastic resin film.

This sheet-shaped continuous material (41a) is free to bend, so that, after cutting it into a desired length, if it is bent to a desired configuration and further subjected to a heat treatment to cure the thermosetting resin, there can be obtained a light-weight and tough plastic material.

For linearly curing the thermosetting resin in the sheet-shaped continuous material (41a) without bending it, it is linearly drawn through a curing tank (26) as shown in FIGS. 2 and 6. In this case, as aforementioned, productivity can be raised by treating a plural number of sheets simultaneously.

To form a channel-shaped or corrugated sheet-shaped continuous material, a deforming die (44) channel-shaped in section or a die (45) corrugate-shaped in section, such as shown in FIG. 11 or 12, is provided at a location in or adjacent the inlet of the curing tank (26) filled with 90° to 95°C hot water (28). The flat sheet-shaped continuous material (41a), which was formed by the process shown in FIG. 5, is passed through channel-shaped passage (46) or corrugated passage (47) in the deforming die (44) or (45) by drawing the continuous material with draw means (27a). Preferably, the passage (46) or (47) in the deforming die (44) or (45) is so formed that its section is gradually shaped into the desired configuration as the passage nears its outlet. The thermosetting resin inside of the channel-shaped or corrugated sheet-shaped continuous material which has passed the deforming die is partly cured to such an extent as to allow retention of the channel or corrugated shape and is completely cured after passing through the curing tank (26). The channel-shaped or corrugated sheet-shaped continuous material (41b) the resin in which has been cured and which has been drawn out by the draw means (27a) is then cut to desired lengths by a cutter (39).

Since the thus formed channel-shaped or corrugated sheet-shaped continuous material (41b) is perfectly covered with the thermoplastic resin, the glass fibers do not project from its surface and it always has a good external appearance.

While the present invention has been described by way of some preferred embodiments thereof, it will be apparent that various alterations and modifications may be made within the spirit of the present invention. For example, angle-shaped continuous material may be formed by using an angle-shaped deforming die in the process shown in FIG. 10.

What is claimed is:

1. A process for rapid production of fiber reinforced cured thermosetting resin material, comprising the steps of impregnating a continuously supplied reinforcing fiber material with an uncured thermosetting resin, shaping said impregnated fiber material into a predetermined cross-sectional configuration by passing said fiber material straight through a series of shaping dies which have openings arranged to gradually become smaller in cross-section, leading said shaped impregnated fiber material into a central passage of an extrusion die, said central passage having a cross-sectional shape which is substantially the same as that of the shaping die closest to the extrusion die, extruding through said extrusion die a thin molten layer of molten thermoplastic resin around and spaced from said shaped impregnated fiber material immediately after the fiber material comes out of said extrusion die and converging said thin layer of molten thermoplastic resin radially toward and in the direction of advancement of said shaped impregnated fiber material while producing a negative pressure between the inside of said extruded thermoplastic resin and said shaped impregnated fiber material for firmly covering said shaped impregnated fiber material with said molten thermoplastic resin, immediately leading said thus covered fiber material into a cooled water tank at a speed of about 1 m/sec. to solidify said thermoplastic resin and thereby to cover said shaped impregnated fiber material, cutting said covered fiber material into predetermined lengths of more than 10 m, and thereafter passing a plurality of cut pieces of said fiber material simultaneously and in spaced parallel relation through a heated water tank to cure said thermosetting resin, whereby the covered fiber material can be produced at a relatively high speed and the thus rapidly produced covered material can be cured at a slower speed.

2. A process according to claim 1, wherein viscosity of said molten thermoplastic resin is more than 1,000 poise.

3. A process according to claim 1, wherein a plural number of reinforcing fiber rovings are used as said reinforcing fiber material and said rovings are bundled together, impregnated with said uncured thermosetting resin and shaped into and after a solid circular cross-sectional configuration.

4. A process according to claim 1, wherein said reinforcing fiber material impregnated with said thermosetting resin is annularly shaped around a continuously supplied core pipe, thereby forming a pipe-shaped continuous material.

5. A process according to claim 1, wherein said resin-impregnated reinforcing fiber material is shaped into flat-rectangular cross-sectional configuration to form a sheet-shaped continuous material.

6. A method according to claim 4, wherein said core pipe is continuously formed from a thermoplastic resin and supplied at the same speed as said reinforcing fiber material.

7. A method according to claim 5, wherein said formed sheet-shaped continuous material is bent crosswise while passing through a curing tank to thereby form a continuous material having a desired sectional form.

8. A method according to claim 6, wherein said reinforcing material comprises rovings and a mat, said rovings being impregnated with said uncured thermosetting resin and being sandwiched around said mat while being advanced into said shaping step.

9. A method according to claim 7, wherein said reinforcing material comprises rovings and a mat, said rovings being impregnated with said uncured thermosetting resin and being sandwiched around said mat while being advanced into said shaping step.

10. A method according to claim 1, wherein said reinforcing fiber material is glass fiber.

* * * * *